United States Patent
Suzuki et al.

(10) Patent No.: US 11,408,471 B2
(45) Date of Patent: Aug. 9, 2022

(54) WEAR DEBRIS COLLECTION DEVICE, ANALYSIS SYSTEM, WEAR DEBRIS COLLECTION METHOD, AND ANALYSIS METHOD

(71) Applicant: AKEBONO BRAKE INDUSTRY CO., LTD., Tokyo (JP)

(72) Inventors: Shigetomo Suzuki, Tokyo (JP); Taro Matsuda, Tokyo (JP); Hidehiko Nakagawa, Tokyo (JP); Yasuko Yamazaki, Tokyo (JP); Atsushi Ueno, Tokyo (JP); Ayumu Okunari, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 115 days.

(21) Appl. No.: 17/047,527

(22) PCT Filed: Apr. 17, 2019

(86) PCT No.: PCT/JP2019/016533
§ 371 (c)(1),
(2) Date: Oct. 14, 2020

(87) PCT Pub. No.: WO2019/203281
PCT Pub. Date: Oct. 24, 2019

(65) Prior Publication Data
US 2021/0148422 A1    May 20, 2021

(30) Foreign Application Priority Data
Apr. 20, 2018  (JP) .............................. JP2018-081357

(51) Int. Cl.
*F16D 65/00*   (2006.01)
*F16D 55/22*   (2006.01)
(Continued)

(52) U.S. Cl.
CPC .......... *F16D 65/0031* (2013.01); *F16D 55/22* (2013.01); *G01M 99/007* (2013.01); *G01N 3/565* (2013.01)

(58) Field of Classification Search
CPC .. F16D 65/0031; F16D 55/22; G01M 99/007; G01N 3/565; G01N 3/56
(Continued)

(56) References Cited

U.S. PATENT DOCUMENTS

| | | |
|---|---|---|
| 4,440,270 A | 4/1984 | Ross |
| 4,967,608 A | 11/1990 | Yost |
| 5,162,053 A | 11/1992 | Kowalski, Jr. |

FOREIGN PATENT DOCUMENTS

| | | |
|---|---|---|
| JP | S61-137043 A | 6/1986 |
| JP | S61-236068 A | 10/1986 |

(Continued)

OTHER PUBLICATIONS

Mitsubishi Electric Corporation. Lossnay Technical Manual. <Product Ed.> <Control/Design Ed.>, Jul. 2009, p. 3.
(Continued)

*Primary Examiner* — Robert R Raevis
(74) *Attorney, Agent, or Firm* — Faegre Drinker Biddle & Reath LLP

(57) ABSTRACT

A wear debris collection device includes a rotation body that is connected to a rotation shaft and performs rotating movement in accordance with rotation of the rotation shaft, a braking member that brakes the rotating movement of the rotation body, a hood covering the rotation body and the braking member and to prevent dust from entering from outside, a blower that blows air into the hood, a collection apparatus that suctions air in the hood and collects wear debris of the braking member contained in the air, and an air pressure adjuster that measures air pressure in the hood and
(Continued)

external air pressure and adjusts an air quantity of at least one of the blower and the collection apparatus so that the air pressure in the hood equals the external air pressure.

8 Claims, 4 Drawing Sheets

(51) Int. Cl.
 *G01M 99/00* (2011.01)
 *G01N 3/56* (2006.01)
(58) Field of Classification Search
 USPC ............... 73/7, 128, 863.21, 863.22, 863.23, 73/863.01, 864.34, 864.35
 See application file for complete search history.

(56) References Cited

FOREIGN PATENT DOCUMENTS

| | | |
|---|---|---|
| JP | 2014-031730 A | 2/2014 |
| WO | WO-2017-097901 A1 | 6/2017 |

OTHER PUBLICATIONS

International Search Report dated May 28, 2019 for PCT/JP2019/016533.
Written Opinion dated May 28, 2019 for PCT/JP2019/016533 [Partial English].
Extended European Search Report dated Jan. 5, 2022 in European Patent Application No. 19788477.8.

WEAR DEBRIS COLLECTION DEVICE, ANALYSIS SYSTEM, WEAR DEBRIS COLLECTION METHOD, AND ANALYSIS METHOD

TECHNICAL FIELD

The present invention relates to an wear debris collection device, an analysis system, an wear debris collection method, and an analysis method.

BACKGROUND ART

As measures against atmospheric pollution, for example, World Health Organization (WHO) has established environmental standards for atmospheric suspended particles. And based on this, standards for suspended particulate matter (SPM) and particulate matter (PM2.5) have been established by regions.

The suspended particulate matter is a general term for particles having a diameter of 10 μm or less and suspended in the atmosphere for a long time among particulate matter suspended in the atmosphere. The particulate matter is small particles of 2.5 μm or less that are suspended in the atmosphere, and smaller than the suspended particulate matter.

In automobiles, a weight regulation for particles that can be collected by a filter and PN (Particulate Number) regulation for particles having a particle diameter of 23 nm to 2.5 μm have been established as PM regulation values for exhaust gas in the related art. Further, in addition to the exhaust gas, tire wear debris and brake wear debris have not been regulated, but discussions thereof have been ongoing. Therefore, there is a need for a technique for collecting various types of wear debris and quantitatively evaluating the collected wear debris.

On the other hand, an wearing monitoring system of Patent Literature 1 discloses a technique for estimating an wearing state of a lubricated component. The wearing monitoring system includes a supply oil amount acquisition mechanism that measures an amount of lubricating oil supplied to the lubricated component, a supply oil thermometer that measures oil temperature of the supplied lubricating oil, a discharge oil meter that measures an amount of lubricating oil discharged to downstream of the lubricated component, a discharge oil thermometer that measures oil temperature of the discharged lubricating oil, an wear debris concentration meter that measures a concentration of wear debris in the discharged lubricating oil, and a control device.

Patent Literature 2 discloses a technique for eliminating generation of dust at a spindle rotation bearing portion and inflow of dust from a bearing gap in a magnetic disk device. Specifically, the magnetic disk device includes a spindle portion, an air bearing that supports the spindle portion, a cover that blocks the spindle portion and the air bearing from external air, and an air pump that raises air pressure in the cover above external air pressure, provided with a flow path that supplies air supplied to the air bearing with high-pressure air in the cover.

CITATION LIST

Patent Literature

Patent Literature 1: JP-A-2014-31730
Patent Literature 2: JP-A-561-236068

SUMMARY OF INVENTION

Technical Problem

For example, when a brake device such as a disc brake or a drum brake mounted on an automobile or the like operates, wear debris is generated due to wearing of a brake pad or a rotor. In order to quantitatively evaluate the wear debris generated from such a brake device, it is necessary to collect all the wear debris. Therefore, it is assumed to cover an outer side of the brake device with a highly airtight cover or hood so as not to allow the generated wear debris to escape.

However, in a case of the brake device, it is necessary to couple a rotation portion such as a rotation shaft or a disc with an external device, and it is difficult to completely seal the entire hood covering the brake device from external air. Therefore, there is a gap created that allows communication between the inside and the outside of the hood covering the brake device, and it is expected that extra dust enters an internal space of the hood from outside through the gap or a part of wear debris generated inside the hood leaks out. As a result, a difference is generated between an amount of generated wear debris and an amount of collected wear debris, and wear debris cannot be accurately measured.

The technique of Patent Literature 2 aims to increase cleanliness in the magnetic disk device, accordingly it is designed to prevent dust from entering the magnetic disk device but not prevent dust from leaking out of the magnetic disk device, or rather, dust is positively discharged out of the magnetic disk device when generated in the magnetic disk device. For this reason, even when the technique of Patent Literature 2 is applied to measuring an amount of wear debris in the brake device, a part of wear debris to be evaluated leaks outside the hood and accordingly the wear debris cannot be accurately evaluated.

The present invention has been made in view of the above-described circumstances, and an object thereof is to provide an wear debris collection device, an analysis system, an wear debris collection method, and an analysis method that can be used to measure wear debris generated in a brake device including a rotation body.

Solution to Problem

In order to achieve the above object, the wear debris collection device, the analysis system, the wear debris collection method, and the analysis method according to the present invention have the following characteristics in (1) to (8).

(1) A wear debris collection device includes:
 a rotation body that is connected to a rotation shaft and performs rotating movement in accordance with rotation of the rotation shaft;
 a braking member that brakes the rotating movement of the rotation body;
 a hood covering the rotation body and the braking member and to prevent dust from entering from outside;
 a blower that blows air into the hood;
 a collection apparatus that suctions air in the hood and collects wear debris of the braking member contained in the air; and
 an air pressure adjuster that measures air pressure in the hood and external air pressure and adjusts an air quantity of at least one of the blower and the collection apparatus so that the air pressure in the hood equals the external air pressure.

According to the wear debris collection device having the configuration in (1), the air pressure in the hood is automatically adjusted so as to equal the external air pressure by operation of the air pressure adjuster. That is, since no differential pressure is generated between the air pressure in the hood and the external air pressure, airflow doesn't occur due to a difference in pressure therebetween. Therefore, dust outside the hood hardly enters the hood, and the wear debris generated inside the hood does not leak to the outside. For this reason, the collection apparatus can collect all the wear debris generated by the braking member, and dust from outside does not mix into the collected wear debris.

(2) The wear debris collection device according to (1), further includes:
  a bearing rotatably supporting the rotation shaft,
  the hood includes a seal portion covering an outer periphery of the bearing.

According to the wear debris collection device having the configuration in (2), the rotation shaft can be supported by the bearing so that the rotation of the rotation shaft is not hindered. Further, since the seal portion covers a portion of the outer periphery of the bearing, it is possible to seal the portion so that there is no gap in the portion and the rotation of the rotation shaft is not hindered. That is, since there is no gap in a portion other than a rotation portion, dust and wear debris hardly pass through such a gap.

(3) In the wear debris collection device according to (1) or (2),
  the air pressure adjuster measures the air pressure in the hood at a position between the braking member and the blower and above the braking member.

According to the wear debris collection device having the configuration in (3), in the air flowing in the hood, since the air pressure is measured at a position upstream of the braking member that generates heat and above the braking member, the air pressure is hardly affected by heat of the braking member and the generated wear debris. Therefore, stable pressure control can be performed.

(4) An analyzing system includes:
  the wear debris collection device according to any one of (1) to (3); and
  a measurement portion that measures an amount or a particle distribution of the wear debris contained in the air suctioned by the collection apparatus.

According to the analysis system having the configuration in (4), of wear debris generated by the braking member, the wear debris contained in the air suctioned by the collection device can be measured by the measuring unit. Therefore, it is possible to quantitatively evaluate the wear debris generated by the braking member. Since the rest of the wear debris that drops down instead of being contained in the suctioned air deposits in an inner space of the hood, it is possible to quantitatively evaluate all the wear debris by separately measuring the depositing wear debris.

(5) A wear debris collection method for collecting wear debris generated from a braking member that brakes rotating movement of a rotation body,
  and the rotation body is rotatable by a rotation shaft rotatably supported by a bearing, the wear debris collection method includes:
  covering the rotation body and the braking member with a hood to prevent dust from entering from outside;
  blowing air into the hood by a blower;
  suctioning air in the hood, and collecting wear debris of the braking member contained in the air, by a collection apparatus;
  measuring air pressure in the hood and external air pressure, and controlling an air quantity of at least one of the blower and the collection apparatus so that the air pressure in the hood equals the external air pressure, by an air pressure adjuster.

According to the wear debris collection method having the configuration in (5), since the air pressure in the hood is adjusted to equal the external air pressure, no differential pressure is generated between the air pressure in the hood and the external air pressure. For this reason, no airflow occurs due to a difference in pressure therebetween. Therefore, dust outside the hood hardly enters the hood, and the wear debris generated inside the hood does not leak to the outside. For this reason, it is possible to collect all the wear debris generated by the braking member by the collection apparatus, and dust from outside does not mix into the collected wear debris.

(6) The wear debris method according to (5),
  a seal portion of the hood seals a gap at a position where an outer periphery of the bearing is covered.

According to the wear debris collection method having the configuration in (6), since the seal portion covers a portion of the outer periphery of the bearing, it is possible to seal the portion so that there is no gap in the portion and the rotation of the rotation shaft is not hindered. That is, since there is no gap in a portion other than a rotation portion, dust and wear debris hardly pass through such a gap.

(7) The wear debris collection method according to (5) or (6),
  the air pressure adjuster measures the air pressure in the hood at a position between the braking member and the blower and above the braking member.

According to the wear debris collection method having the configuration in (7), in the air flowing in the hood, since the air pressure is measured at a position upstream of the braking member that generates heat and above the braking member, the air pressure is hardly affected by heat of the braking member and the generated wear debris. Therefore, stable pressure control can be performed.

(8) An analysis method includes:
  measuring an amount or a particle distribution of the wear debris contained in air suctioned by the collection apparatus used in the wear debris collection method according to any one of (5) to (7) by a predetermined measurement portion.

According to the analysis method having the configuration in (8), of wear debris generated by the braking member, the wear debris contained in the air suctioned by the collection apparatus can be measured by the measuring unit. Therefore, it is possible to quantitatively evaluate the wear debris generated by the braking member. Since the rest of the wear debris that drops down instead of being contained in the suctioned air deposits in an inner space of the hood, it is possible to quantitatively evaluate all the wear debris by separately measuring the depositing wear debris.

Advantageous Effects of Invention

According to the wear debris collection device, the analysis device, the wear debris collection method, and the analysis method of the present invention, it is possible to provide an wear debris collection technology that can be used to measure wear debris generated in a brake device including a rotation body. That is, since no differential pressure is generated between the air pressure in the hood and the external air pressure, no airflow occurs due to a difference in pressure therebetween. That is, dust outside the hood hardly enters the hood, and the wear debris generated inside the hood does not leak to the outside. For this reason, the collection apparatus can collect all the wear debris generated by the braking member, and dust from outside does not mix into the collected wear debris.

The present invention has been briefly described as above. Details of the present invention will be further clarified by reading a mode for carrying out the present invention (hereinafter, referred to as "embodiment") described below with reference to the accompanying drawings.

DESCRIPTION OF EMBODIMENTS

A specific embodiment according to the present invention will be described with reference to the drawings.

<Configuration Example of Analysis System for Implementing Invention>

Figure 1:
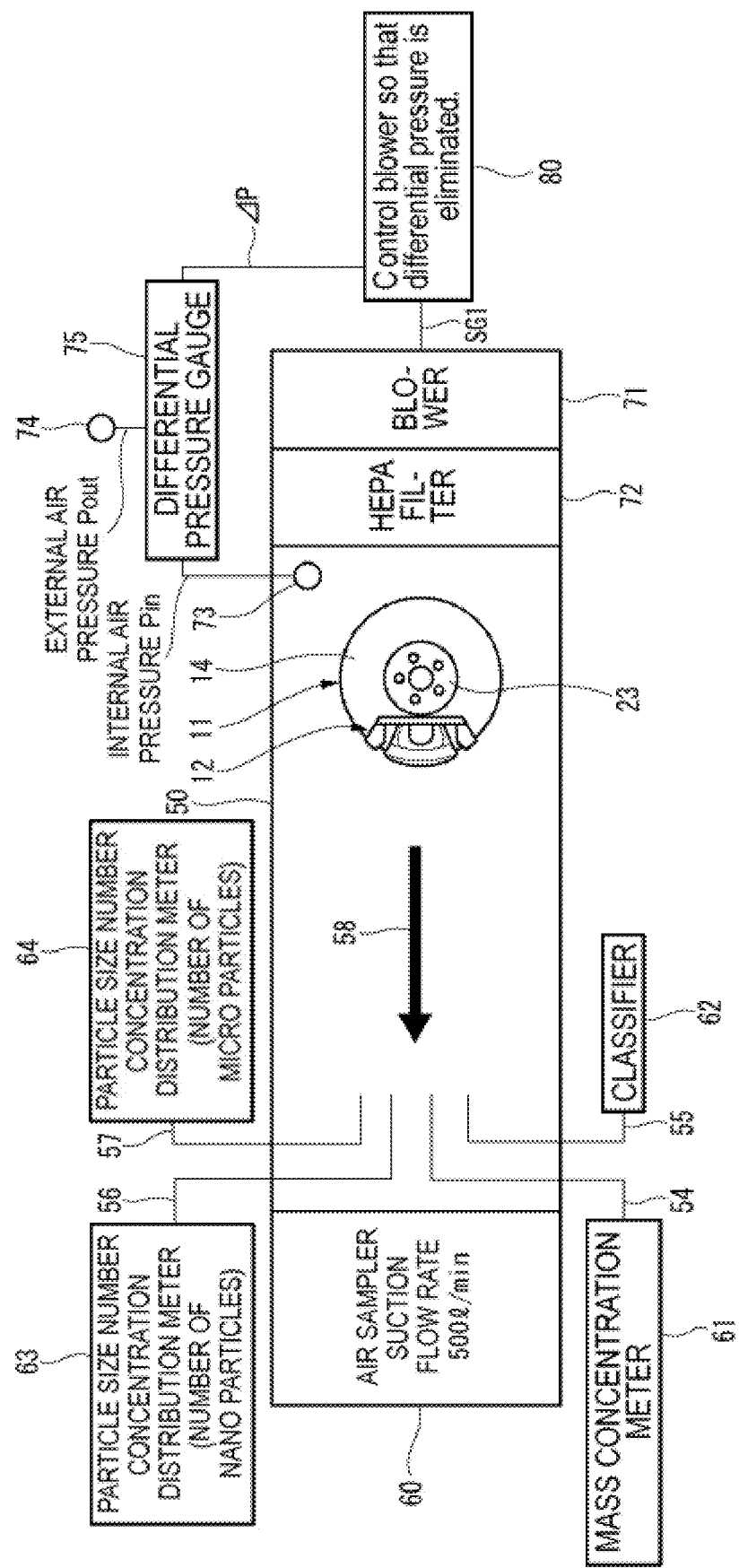
FIG. 1 is a block diagram showing a configuration example of a system including a wear debris collection device.

FIG. 1 shows a configuration example of an analysis system including a wear debris collection device. The analysis system shown in FIG. 1 is assumed to collect wear debris generated due to wearing of a brake pad in a caliper 12 or a disc-shaped rotor 14 when a brake 11 used in an automobile or the like operates, and to evaluate an amount of the generated wear debris. Therefore, the system can also be used for collecting wear debris generated from a rotation body other than the brake.

The brake 11 shown in FIG. 1 is coupled to a brake testing device 10 to be described later, and is held in a state in which the rotor 14 is rotatable and the caliper 12 is operable. The brake 11 is provided in an inner space of a brake hood 50. That is, a portion where wear debris is generated and a portion where the generated wear debris scatters are covered with the brake hood 50 so that entire peripheries of both of the portions are sealed.

As a result, the wear debris generated inside the brake hood 50 can be prevented from leaking out of the brake hood 50, and dust or the like outside the brake hood 50 can be prevented from entering the brake hood 50. However, it is necessary to connect a rotation portion such as a shaft inside and outside the brake hood 50 when the brake 11 is tested, accordingly, it is difficult to completely eliminate a gap that communicates the inside and the outside of the brake hood 50 even if a seal is applied. Therefore, pressure control to be described later is performed so that wear debris and dust do not pass through the gap. By the pressure control, it is possible to collect all the generated wear debris and prevent dust or the like from outside other than wear debris from being mixed into the wear debris.

As shown in FIG. 1, a High Efficiency Particulate Air Filter (HEPA) filter 72 is provided on a right side of the brake hood 50, and a blower 71 is provided on a right side of the HEPA filter 72. The blower 71 can feed external air into the inner space of the brake hood 50. An air quantity fed by the blower 71 is variable, and is controlled by a control signal SG1. The HEPA filter 72 removes dust or the like from the air fed by the blower 71 and cleans it.

On the other hand, an air sampler 60 is coupled to a left side of the brake hood 50. The air sampler 60 can suctions an airflow 58 from a position where the air sampler 60 communicates with the inner space of the brake hood 50, and can collect suspended wear debris contained in the airflow 58. The air sampler 60 has a suction capacity of, for example, about 500 [l/minute], and the suction flow rate is variable. When the air quantity fed by the blower 71 is controlled, the suction flow rate of the air sampler 60 may be constant.

Communication portions 54, 55, 56, and 57 are provided to communicate with the inner space of the brake hood 50. One end of the communication portion 54 is connected to a mass concentration meter 61, one end of the communication portion 55 is connected to a classifier 62, one end of the communication portion 56 is connected to a particle size number concentration distribution meter 63, and one end of the communication portion 57 is connected to a particle size number concentration distribution meter 64.

In practice, a known device may be used. For example, when a device based on a principle of measuring a mobility diameter is used as the particle size number concentration distribution meter 63, it is possible to perform real-time measurement mainly on particles of nano-level particle size, and a particle distribution can be measured. The particle distribution shows the number concentration distribution for each particle size.

When a device based on a principle of a light scattering diameter is used as the particle size number concentration distribution meter 64, it is possible to perform real-time measurement mainly on particles of micro-level particle size, and a particle distribution can be measured.

When a light scattering method is used in the mass concentration meter 61, it is possible to perform real-time measurement mainly on particles of micro-level particle size.

When a device based on a principle of an aerodynamic diameter is used as the cascade impactor 62, it is possible to individually collect and analyze wear debris having particle sizes of, for example, less than 2.5 [μm], 2.5 [μm], and 10 [μm].

Therefore, in the configuration of the analysis system shown in FIG. 1, a part of the mass concentration meter 61, the classifier 62, the particle size number concentration distribution meter 63, and the particle size number concentration distribution meter 64 may be omitted or another measurement device may be added depending on a required analysis content or application.

As shown in FIG. 1, a pressure sensor 73 is installed inside the brake hood 50. The pressure sensor 73 is installed between the blower 71 and the brake 11 and above the caliper 12 or the rotor 14. The pressure sensor 73 is provided at this position to avoid being affected by heat during brake operation. That is, when the pressure sensor 73 is located upstream of the brake 11 relative to a direction of the airflow 58 and at an upper position, characteristics of the pressure sensor 73 can be prevented from varying due to heat generated by the brake 11.

On the other hand, a pressure sensor 74 is installed in a space outside the brake hood 50 to detect external air pressure Pout. The pressure sensor 73 can detect internal air pressure Pin in the brake hood 50. A differential pressure gauge 75 outputs a differential pressure signal ΔP indicating a differential pressure between the internal air pressure Pin detected by the pressure sensor 73 and the external air pressure Pout detected by the pressure sensor 74.

A control unit 80 generates the control signal SG1 based on the differential pressure signal ΔP output by the differential pressure gauge 75, and controls the blower 71 to eliminate the differential pressure between the internal air pressure Pin and the external air pressure Pout. For example, when the control unit 80 detects a state that the internal air pressure Pin is lower than the external air pressure Pout by the differential pressure signal ΔP, the control unit 80 adjusts the control signal SG1 so as to increase an air quantity fed by the blower 71 per unit time. When the control unit 80 detects a state that the internal air pressure Pin is higher than the external air pressure Pout by the differential pressure signal ΔP, the control unit 80 adjusts the control signal SG1 so as to reduce the air quantity fed by the blower 71 per unit time.

That is, although pressure in the inner space of the brake hood 50 is reduced by the suction of air by the air sampler 60, the reduced amount can be compensated for by pressure of air supplied into the brake hood 50 by the blower 71. Therefore, the internal air pressure Pin is controlled to be the same as the external air pressure Pout by adjusting the amount of fed air.

Although the control unit 80 in the analysis system shown in FIG. 1 controls the air quantity fed by the blower 71 to eliminate the differential pressure between the internal air pressure Pin and the external air pressure Pout, the control unit 80 may also control the suction flow rate of the air sampler 60 instead, or control both of them. In a case of controlling the suction flow rate of the air sampler 60, the control unit 80 performs control to reduce the suction flow rate per unit time when detecting a state that the internal air pressure Pin is lower than the external air pressure Pout by the differential pressure signal ΔP. When detecting a state that the internal air pressure Pin is higher than the external air pressure Pout by the differential pressure signal ΔP, the control unit 80 performs control to increase the suction flow rate per unit time.

When such control is performed, the differential pressure between the internal air pressure Pin and the external air pressure Pout is eliminated and accordingly no airflow occurs due to the differential pressure. That is, even when there is a gap that communicates the inside and the outside of the brake hood 50, wear debris suspended in the air in the brake hood 50 does not leak to the outside from the gap since there is no airflow through the gap. At the same time, dust or the like outside the brake hood 50 does not enter the brake hood 50 from the gap. As a result, it is possible to collect all the wear debris generated in the brake 11, and dust does not mix into the collected wear debris.

In practice, a part of the wear debris generated in the brake 11 directly drops down and deposits on a bottom portion of the brake hood 50. The rest of the wear debris maintains suspended in the airflow 58, passes through a small-diameter portion 53, and is collected by the air sampler 60. Therefore, all the wear debris can be measured by individually collecting the suspended wear debris collected by the air sampler 60 and the depositing wear debris on the bottom portion of the brake hood 50.

<Configuration Example of Brake Testing Device>

Figure 2:
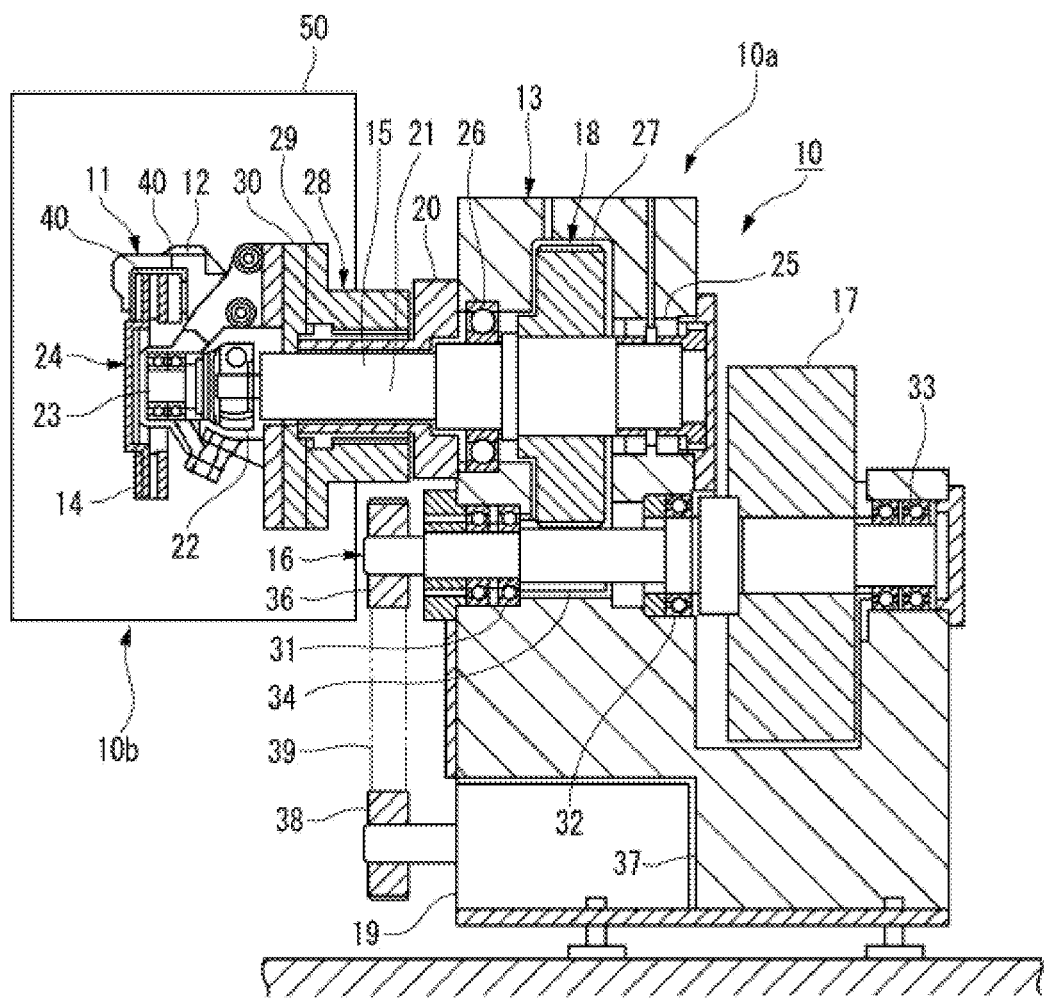
FIG. 2 is a longitudinal sectional view showing a configuration example of a brake testing device including the wear debris collection device.

FIG. 2 is a longitudinal sectional view showing a configuration example of a brake testing device including the wear debris collection device shown in FIG. 1. A basic configuration of the brake testing device 10 shown in FIG. 2 is the same as that in JP-A-10-300597. The brake testing device 10 further includes the brake hood (cover) 50 that covers the brake 11 in order to collect wear debris and a seal structure that prevents leakage of the wear debris or the like and inflow of dust from outside from the gap. That is, the configuration shown in FIG. 2 is an example, and the configuration of the brake testing device 10 to which the present invention is applied can be changed as necessary.

The brake testing device 10 shown in FIG. 2 will be described below.

The brake testing device 10 includes a low-speed rotation shaft 15 to which the rotor 14 of the brake 11 is attached, a high-speed rotation shaft 16 arranged in parallel to the low-speed rotation shaft 15, and a flywheel 17 attached to the high-speed rotation shaft 16. The flywheel 17 generates an inertial force simulating a weight of a vehicle on which the brake 11 is mounted.

The brake testing device 10 further includes a deceleration unit 18 that decelerates a rotational speed of the high-speed rotation shaft 16 and transmits the decelerated speed to the low-speed rotation shaft 15, a motor 19 that drives the high-speed rotation shaft 16, a base 13 that supports these parts, a control unit that controls these parts, and a measuring unit (not shown) that measures various types of data of the brake 11.

The low-speed rotation shaft 15 includes a first rotation shaft 21 and a second rotation shaft 23 coupled to the first rotation shaft 21 by a universal joint 22. The second rotation shaft 23 includes a large-diameter disc portion 24 at a left end in the drawing and the rotor 14 is fitted to the disc portion 24 and fixed by a screw. The low-speed rotation shaft 15 is supported by bearings 25, 26 attached to the base 13. A large gear 27 of the deceleration unit 18 is attached to a portion between the bearings 25, 26 of the low-speed rotation shaft 15.

A sleeve 20 fixed to the base 13 is disposed at a portion on a left side of a center of the low-speed rotation shaft 15. A housing 28 is attached to the sleeve 20 via two bearings. The caliper 12 of the brake 11 is attached to a flange portion 29 of the housing 28 via a plate 30. That is, the housing 28 serves as a caliper holding unit.

The high-speed rotation shaft 16 is supported by bearings 31, 32, and 33. The high-speed rotation shaft 16 is provided with a small gear 34 that meshes with the large gear 27 attached to the low-speed rotation shaft 15 and the small gear 34 and the large gear 27 together constitute the deceleration unit 18. A pulley 36 is fitted to a left end of the high-speed rotation shaft 16 in the drawing.

On the other hand, the motor 19 is provided in a recessed groove 37 provided at a lower end of the base 13, and a pulley 38 is attached to a rotation shaft of the motor 19. A belt 39 is wound around the pulley 36 on the high-speed rotation shaft 16 and around the pulley 38 on the rotation shaft of the motor 19, and thereby the high-speed rotation shaft 16 is driven by the motor 19.

Although, it is assumed that the deceleration unit 18 is used in the configuration shown in FIG. 2, the deceleration unit 18 may also be omitted and a driving force of the motor 19 may be directly transmitted to the first rotation shaft 21.

In the brake testing device 10 shown in FIG. 2, when the high-speed rotation shaft 16 is driven by the motor 19, a rotational force of the high-speed rotation shaft 16 is transmitted to the rotor 14 via the deceleration unit 18 and the low-speed rotation shaft 15. In this state, a friction material 40 in the caliper 12 is pressed against the rotor 14. At this time, brake characteristics of the brake 11 can be determined by measuring a strain of the low-speed rotation shaft 15 and other various types of data.

In the brake testing device 10, the brake hood 50 is fixed to an outer side of the housing (caliper holding unit) 28 that does not rotate. The brake hood 50 covers and accommodates an entire outer side of a brake attached portion 10b including the caliper 12 and the rotor 14 of the brake 11.

When the friction material 40 in the caliper 12 is pressed against the rotor 14, a pressing surface between the rotor 14 and the friction material 40 abrades due to a frictional force. By this wearing, the rotor 14 and the friction material 40 generate wear debris. A part of the generated wear debris is suspended in the air, and the rest of the wear debris drops down and deposits on the bottom portion of the brake hood 50.

That is, all the generated wear debris is in the brake hood 50, and accordingly can be collected. Therefore, it is possible to correctly measure an amount of the generated wear debris. However, since the first rotation shaft 21 or the like that rotates during the test is coupled across the testing device body 10a and the brake attached portion 10b, it is difficult to completely eliminate a gap generated in these coupling positions.

However, the analysis system shown in FIG. 1 can prevent an airflow due to the differential pressure from being generated in the gap since the control unit 80 automatically performs control to eliminate the pressure differential between the internal air pressure Pin and the external air pressure Pout. As a result, it is possible to prevent leakage of wear debris and entering of dust from the gap. Further, as shown in FIG. 2, the brake hood 50 is fixed to the outer side of the housing 28 that does not rotate at a portion where the testing device body 10a and the brake attached portion 10b are coupled. As a result, it is possible to prevent a gap in a connection portion of the brake hood 50.

<Specific Example of Detailed Structure>

Figure 3:
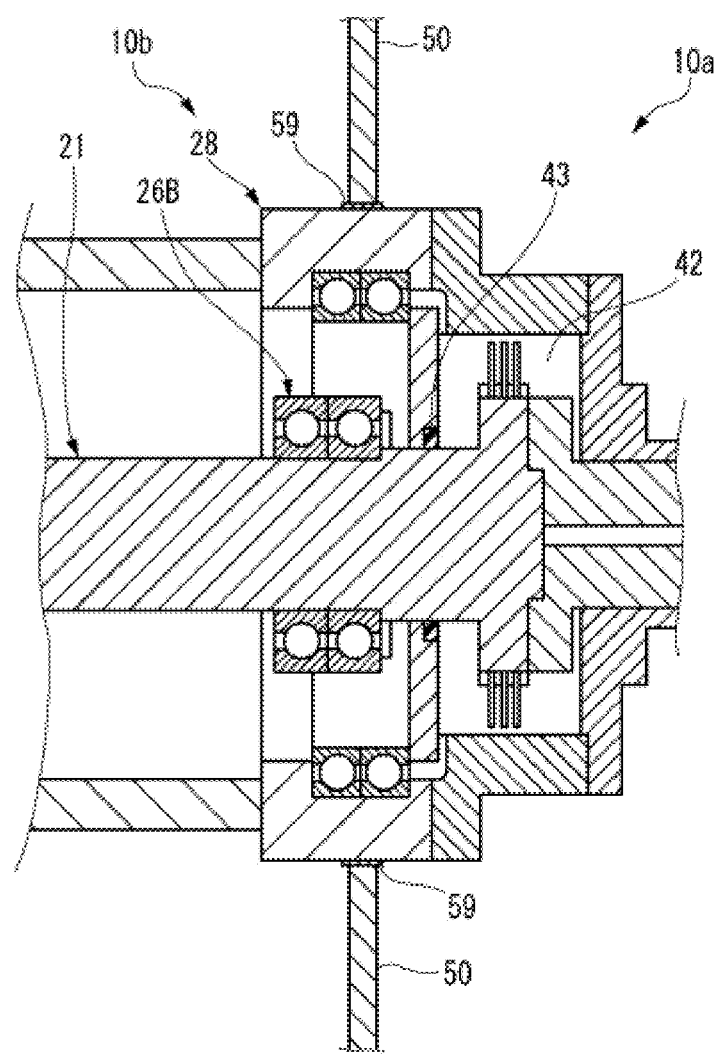
FIG. 3 is a sectional view showing a configuration example of a vicinity of a coupling portion between a testing device body and a brake attached portion.

FIG. 3 is a sectional view showing a configuration example of a vicinity of a coupling portion between the testing device body 10a and the brake attached portion 10b.

In the example shown in FIG. 3, an outer periphery of the first rotation shaft 21 is rotatably supported by a bearing 26B. An outer side of the bearing 26B is coupled to the housing 28. The brake hood 50 is fixed to the outer side of the housing 28 via a hood seal portion 59. In other words, the brake hood 50 includes the hood seal portion 59 provided around an outer periphery of the housing 28 accommodating the bearing 26B. Since the housing 28 is a non-rotation portion, the housing 28 can be reliably sealed by the hood seal portion 59 so that there is no gap between the brake hood 50 and the housing 28.

Although there is a gap 42 shown in FIG. 3 in the vicinity of the coupling portion between the testing device body 10a and the brake attached portion 10b, the gap 42 is blocked by the bearing 26B and the first rotation shaft 21, accordingly, air containing wear debris or dust does not pass through the gap 42. Further, an oil seal 43 is provided at a position facing the gap 42.

<Example of Measurement Results by Experiment>

Figure 4:
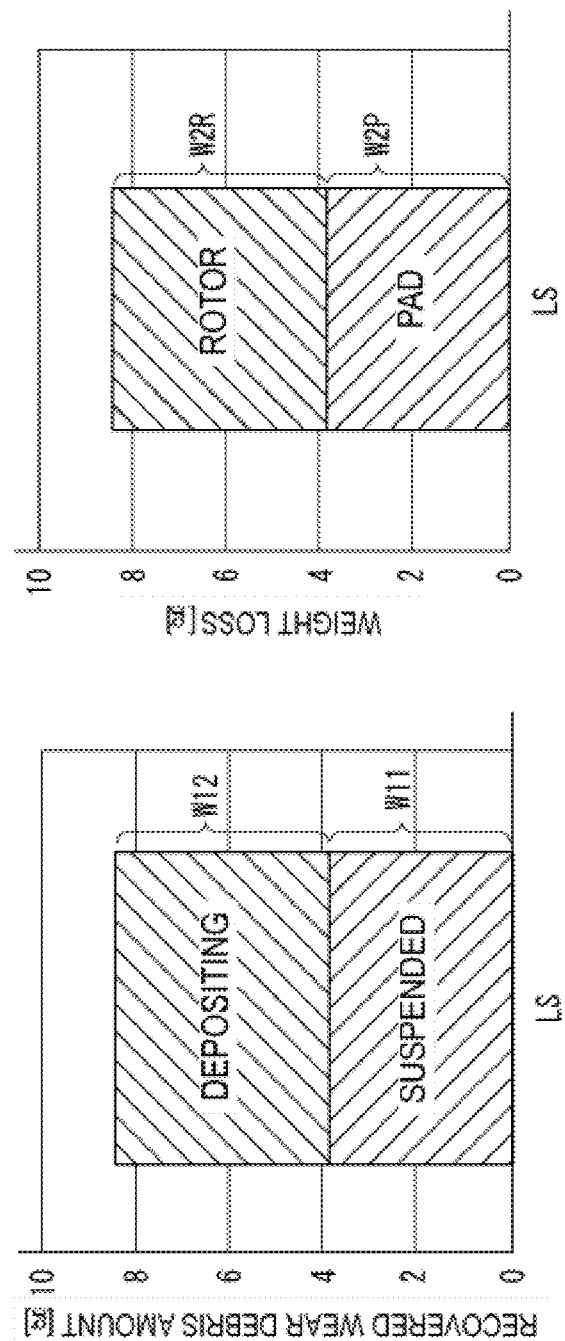
FIG. 4 is a graph showing an example of measurement results of an amount of recovered wear debris and an amount of wearing of a pad and rotor.

FIG. 4 is a graph showing an example of measurement results of an amount of recovered wear debris and an amount of wearing of a pad and rotor.

Traveling conditions of a traveling simulation was created. The traveling simulation assumed a situation in which an actual vehicle travels in a certain section on a real road. Based on the traveling conditions, a traveling simulation of the vehicle related to the brake 11 was performed by the brake testing device 10 as shown in FIGS. 1 to 3. That is, the motor 19 was driven based on a condition at each timing when the vehicle was accelerated, and ON and OFF of the brake 11 was controlled based on a condition when the vehicle was decelerated. An average speed in this experiment was 40 [km/h], an average deceleration was 2.0 [m/s$^2$], and an average temperature was 90 [° C.].

In the experiment that simulated a situation in which the vehicle traveled through a predetermined distance under the above traveling conditions, wear debris generated from the brake 11 was collected and measured by the analysis system shown in FIG. 1. That is, of the actually generated wear debris, the suspended wear debris in the air that is the airflow 58 was collected by the air sampler 60, and the depositing wear debris on the bottom portion of the brake hood 50 was collected from the brake hood 50, and two parts of the wear debris were weighed individually.

By measuring a weight change of the brake pad in the caliper 12 and a weight change of the rotor 14 before and after the experiment, a wearing amount of the brake pad and a wearing amount of the rotor 14 were individually grasped.

A suspended wear debris weight W11, a depositing wear debris weight W12, a pad wearing amount W2P, and a rotor wearing amount W2R shown in FIG. 4 represent results of the experiment on the brake 11 that employed a low steel material LS as a material of the brake pad.

A graph on a left side shown in FIG. 4 represents a recovered wear debris amount [g] that is a result of a sum of the suspended wear debris weight W11 and the depositing wear debris weight W12. A graph on a right side shown in FIG. 4 represents a pad and rotor wearing amount [g] that is a result of a sum of the pad wearing amount W2P and the rotor wearing amount W2R.

As shown in FIG. 4, the recovered wear debris amount (W11+W12) in the experiment of the brake 11 and the pad and rotor wearing amount (W2P+W2R) are substantially the same.

That is, a total weight of wear debris corresponding to wearing generated in the brake pad and the rotor 14 equals a total weight of the suspended wear debris and the depositing wear debris collected by the system of FIG. 1. Therefore, by adopting the system shown in FIG. 1, it is possible to measure a total amount of wear debris actually generated from the brake 11.

Here, characteristics of the wear debris collection device, the analysis system, the wear debris collection method, and the analysis method according to the embodiment of the present invention described above will be briefly summarized in the following [1] to [8].

[1] A wear debris collection device including:
- a rotation body (rotor 14) that is connected to a rotation shaft (first rotation shaft 21) and performs rotating movement in accordance with rotation of the rotation shaft;
- a braking member (caliper 12) that brakes the rotating movement of the rotation body;
- a hood (brake hood 50) covering the rotation body and the braking member and to prevent dust from entering from outside;
- a blower (71) that blows air into the hood;
- a collection apparatus (air sampler 60) that suctions air in the hood and collects wear debris of the braking member contained in the air; and
- an air pressure adjuster unit (control unit 80) that measures air pressure in the hood (internal air pressure Pin) and external air pressure (Pout) and adjusts an air quantity of at least one of the blower and the collection apparatus so that the air pressure in the hood equals the external air pressure.

[2] The wear debris collection device according to [1], further including:
a bearing (bearing 26B) rotatably supporting the rotation shaft,
wherein the hood includes a seal portion (hood seal portion 59) covering an outer periphery of the bearing.

[3] The wear debris collection device according to [1] or [2],
wherein the air pressure adjuster measures the air pressure in the hood (internal air pressure) at a position between the braking member and the blower and above the braking member.

[4] An analyzing system including:
the wear debris collection device according to any one of [1] to [3]; and
a measurement portion (at least one of mass concentration meter 61, classifier 62, and particle size number concentration distribution meters 63, 64) that measures an amount or a particle distribution of the wear debris contained in the air suctioned by the collection apparatus.

[5] A wear debris collection method for collecting wear debris generated from a braking member (brake pad in caliper 12) braking rotating movement of a rotation body (rotor 14),
wherein the rotation body is rotatable by a rotation shaft (first rotation shaft 21) rotatably supported by a bearing (bearing 26B), the wear debris collection method including:
covering the rotation body and the braking member with a hood (brake hood 50) to prevent dust from entering from outside;
blowing air into the hood by a blower (71);
suctioning air in the hood (air sampler 60), and wear debris of the braking member contained in the air is collected, by a collection apparatus (air sampler 60),
measuring air pressure in the hood (internal air pressure Pin) and external air pressure (Pout), and controlling an air quantity of at least one of the blower and the collection apparatus so that the air pressure in the hood equals the external air pressure, by an air pressure adjuster (pressure sensors 73, 74, differential pressure gauge 75, and control unit 80).

[6] The wear debris collection method according to [5], wherein
a seal portion (hood seal portion 59) of the hood seals a gap at a position where an outer periphery of the bearing is covered.

[7] The wear debris collection method according to [5] or [6], wherein
the air pressure adjuster (pressure sensor 73) measures the air pressure in the hood at a position between the braking member and the blower and above the braking member.

[8] An analysis method including:
measuring an amount or a particle distribution of the wear debris contained in air suctioned by the collection apparatus used in the wear debris collection method according to any one of [5] to [7] by a predetermined measurement portion (at least one of mass concentration meter 61, classifier 62, and particle size number concentration distribution meters 63, 64).

Although the present invention has been described in detail with reference to a specific embodiment, it will be apparent to those skilled in the art that various changes and modifications can be made without departing from the spirit and the scope of the present invention.

This application is based on a Japanese patent application (No. 2018-081357) filed on Apr. 20, 2018, the contents of which are incorporated herein by reference.

INDUSTRIAL APPLICABILITY

According to the present invention, it is possible to provide an wear debris collection technique that can be used to measure wear debris generated in a brake device including a rotation body. The present invention having this effect is useful for a wear debris collection device, an analysis system, a wear debris collection method, and an analysis method that can be used to measure wear debris generated in a brake device including a rotation body.

REFERENCE SIGNS LIST 10 brake testing device
10a testing device body
10b brake attached portion
11 brake
12 caliper
13 base
14 rotor
15 low-speed rotation shaft
16 high-speed rotation shaft
17 flywheel
18 deceleration unit
19 motor
20 sleeve
21 first rotation shaft
22 universal joint
23 second rotation shaft
24 disc portion
25, 26, 26B bearing
27 large gear
28 housing (caliper holding unit)
31, 32, 33 bearing
34 small gear
36, 38 pulley
37 recessed groove
39 belt
40 friction material
42 gap
43 oil seal
50 brake hood
54, 55, 56, 57 communication portion
58 airflow
59 hood seal portion
60 air sampler
61 mass concentration meter
62 classifier
63, 64 particle size number concentration distribution meter
71 blower
72 HEPA filter
73, 74 pressure sensor
75 differential pressure gauge
80 control unit
SG1 control signal
Pin internal air pressure
Pout external air pressure
ΔP differential pressure signal
W11 suspended wear debris
W12 depositing wear debris
W2P pad wearing amount
W2R rotor wearing amount

The invention claimed is:

1. A wear debris collection device comprising:
a rotation body that is connected to a rotation shaft and performs rotating movement in accordance with rotation of the rotation shaft;
a braking member that brakes the rotating movement of the rotation body;
a hood covering the rotation body and the braking member and to prevent dust from entering from outside;
a blower that blows air into the hood;
a collection apparatus that suctions air in the hood and collects wear debris of the braking member contained in the air; and
an air pressure adjuster that measures air pressure in the hood and external air pressure and adjusts an air quantity of at least one of the blower and the collection apparatus so that the air pressure in the hood equals the external air pressure.

2. The wear debris collection device according to claim 1, further comprising:
a bearing rotatably supporting the rotation shaft,
wherein the hood includes a seal portion provided around an outer periphery of a housing accommodating of the bearing.

3. The wear debris collection device according to claim 1, wherein the air pressure adjuster measures the air pressure in the hood at a position between the braking member and the blower and above the braking member.

4. An analyzing system comprising:
the wear debris collection device according to claim 1; and
a measurement portion that measures at least one of an amount and a particle distribution of the wear debris contained in the air suctioned by the collection apparatus.

5. A wear debris collection method for collecting wear debris generated from a braking member that brakes rotating movement of a rotation body,
wherein the rotation body is rotatable by a rotation shaft rotatably supported by a bearing, the wear debris collection method comprising:
covering the rotation body and the braking member with a hood to prevent dust from entering from outside;
blowing air into the hood by a blower;
suctioning air in the hood, and collecting wear debris of the braking member contained in the air, by a collection apparatus;
measuring air pressure in the hood and external air pressure, and controlling an air quantity of at least one of the blower and the collection apparatus so that the air pressure in the hood equals the external air pressure, by an air pressure adjuster.

6. The wear debris collection method according to claim 5, wherein
a seal portion of the hood seals a gap at a position around an outer periphery of a housing accommodating the bearing is covered.

7. The wear debris collection method according to claim 5, wherein
the air pressure adjuster measures the air pressure in the hood at a position between the braking member and the blower and above the braking member.

8. An analysis method comprising:
measuring at least one of an amount and a particle distribution of the wear debris contained in air suctioned by the collection apparatus used in the wear debris collection method according to claim 5, by a predetermined measurement portion.

* * * * *